L. Schulze,

Filling Barrels.

No. 4294. Reissued Mar. 7. 1871.

Louis Schulze
by atty R. Pollok

WITNESSES.

D. P. Lowe
J. Nottingham

THE NORRIS PETERS CO., WASHINGTON, D. C.

United States Patent Office.

LOUIS SCHULZE, OF BALTIMORE, MARYLAND.

Letters Patent No. 106,964, dated August 30, 1870; reissue 4,294, dated March 7, 1871.

IMPROVEMENT IN APPARATUS FOR PITCHING BARRELS.

The Schedule referred to in these Letters Patent and making part of the same.

*To whom it may concern:*

Be it known that I, LOUIS SCHULZE, formerly of Louisville, Kentucky, now of the city and county of Baltimore and State of Maryland, have invented certain new and useful Improvements in Apparatus for Pitching Barrels, of which the following is a specification.

In order to coat the interior of barrels, to render them impervious to water, pitch is used. This has been done by introducing melted pitch into the barrel, or by melting the pitch after it has been put into the barrel. To effect the latter result it has been suggested to inject heated air into the barrel, but no apparatus has been devised for the purpose which can be used practically and on an extensive scale.

My invention, therefore, relates to this method of melting the pitch in the barrel by means of a blast of hot air; and It consists of certain improvements in apparatus, which allow the air, carrying with it the inflamed products of combustion, to be introduced into the barrel, which render the apparatus capable of being fitted to barrels of various sizes, and adapt it to be transported with facility from place to place wherever its services are required.

The manner in which these results are or may be attained will be understood by reference to the accompanying drawing, in which—

Figures 3 and 4 are views of detached portions of the apparatus hereinafter referred to.

Figure 3:
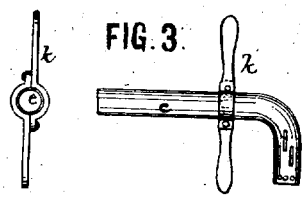

The furnace through which the air to be heated passes on its way to the barrel is represented at B. The air enters at the lower part C of the furnace, through the pipe E, in such manner that it is forced upward through the fire vertically, or practically so, thereby passing, with but little or no change of direction, to the outlet or discharge-pipe D, through which it is conducted to the barrel.

The furnace is supported above the ground upon a stand or frame A, which is portable, and can, with the furnace which it carries, be moved from place to place, as desired. By thus supporting the furnace I am also enabled to connect the pipe E with the bottom of the furnace, and so obtain, without difficulty, the direct upward blast through the fire. This arrangement is also advantageous on other accounts, as it gives me free access to the lower part or bottom of the furnace, if at any time, or for any reason, it should be found desirable or necessary to have access to it.

I prefer to make the furnace of a retort-shape, as shown in the drawing, and to bend or gradually incline the neck or upper part of the same, so that the air shall pass into the conduit or pipe D without any violent or sudden change of direction.

For convenience sake I make the upper part, C, of the furnace separate from the lower, B, so that the former may be taken off whenever necessary; and, to secure the part C in proper position, I make use of a fastening, whereby it may be tightly held to the latter, this being necessary as well to prevent any escape of air when the apparatus is in operation as to hold together the parts of the furnace in case they should be moved bodily and together.

As shown in the drawing, this fastening can be a "bayonet-lock," so called, the part C having inclined edges, *c*, fitting on similar edges, *b*, formed on the part B, which, when turned in one direction, will lock together, but will unlock when turned in the opposite direction.

The upper part of the retort is thus prevented from being blown off or displaced by the force of the blast, and can yet be easily removed for the purpose of cleaning, or filling, or repairing the retort. Under ordinary circumstances, however, I can fill the furnace or retort through a door, G, formed in the upper section C.

Figure 4:
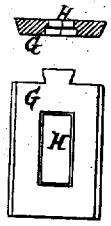
Figure 2:
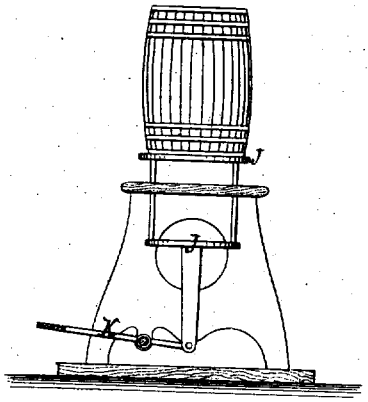
Figure 2 is an elevation of a portion of the same.

The door has beveled side edges, as shown in fig. 4, fitting into similar grooves in the section C, so that it may be easily removed for the purpose of filling the retort, and again closed tightly.

In the upper part of the retort, and, preferably, in the door G, I also form an opening, H, covered with isinglass suitably held in place, the object of this arrangement being to permit the operator to observe the force of the blast, in order that he may the more accurately regulate the same.

The supply of air is maintained by means of a fan or other suitable air-forcing apparatus, F, which connects with the pipe E, the arrangement of which has been already described.

Figure 1:
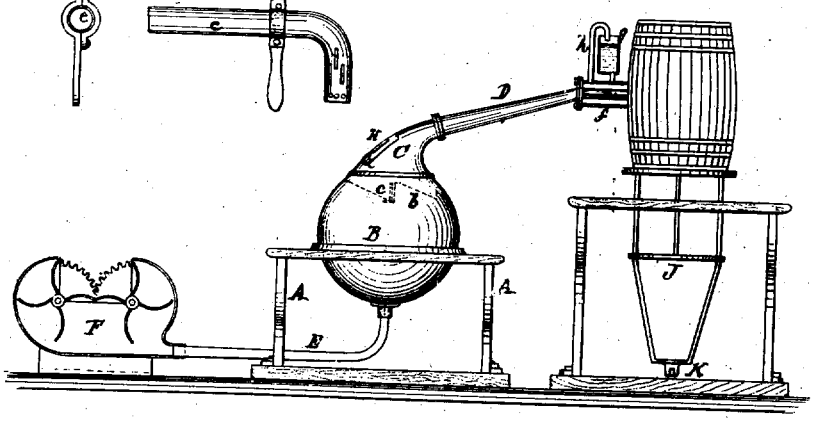
Figure 1 is a side elevation of an apparatus embodying my invention.

The blast-conduit or pipe which leads from the furnace to the barrel should be provided at the end which fits into the barrel with some means for protecting the barrel and preventing it from being charred by contact with the heated pipe. For this purpose a water-jacket, *f*, may be arranged around the end of the pipe, where it is inserted in the bung-hole of the barrel, as shown in fig. 1.

This jacket carries a small reservoir, *g*, which communicates at its bottom directly with the jacket, and is also connected at its top with said reservoir by a tube, *h*, arranged as shown.

Any water that may be vaporized in the jacket by the heat of the pipe rises through the tube *h* and enters the upper part of the reservoir, where it will condense.

It may be found desirable to distribute or direct the blast toward all portions of the barrel in succession; and to this end I connect the pipe D with a short pipe, *e*, in such manner that the said pipe *e* can revolve freshly.

The inner end of the pipe, which is within the barrel, is curved, as shown in fig. 3, and provided with slots and openings, *i j*, suitably arranged, so that, when the apparatus is in operation, the blast will be thrown out with great force through said opening into the barrel.

By revolving the pipe its curved end will direct the blast toward the bottom, top, or sides of the barrel, as desired. The tube can be thus revolved by means of a handle, *k*, attached to it.

In order to adapt the apparatus for use with barrels of different sizes I provide a vertically-adjustable platform or table, J, which can be raised or lowered by means of a lever-treadle, K, or by equivalent means.

The barrel, when placed on the table, is elevated, by depressing the treadle K, to such a height as to permit the blast-pipe to be inserted in the bung-hole.

Any suitable device may be employed to keep the table J in place while the barrel is being pitched, and the treadle may be connected with the table by a ball-and-socket or universal joint, which will permit the table to revolve, if desired.

By forming the furnace with sides gradually inclining and drawn in toward the opening or conduit through which the air passes from the furnace to the barrel, the blast, as above stated, is gradually condensed and concentrated, and is guided toward the barrel without any violent change of direction.

The mouths of the two pipes D E are almost diametrically opposite each other—the one in the top, the other in the bottom of the furnace—so that the air, in passing out from the one through the fire and into the other, will pursue an almost straight course.

The operation of the apparatus will be readily understood. The blast created by the fan passes into the furnace, up through the fire, and into the conduit D, where it is discharged, along with the inflamed products of combustion, into the barrel.

A vent in the top of the barrel allows the smoke, air, &c., to escape.

Having described my invention, and the manner in which the same is or may be carried into effect,

What I claim, and desire to secure by Letters Patent, is—

1. In an apparatus for pitching barrels, organized substantially as described, the arrangement of the pipe or conduit which conveys the blast from the air-forcing apparatus to the furnace, substantially in the manner set forth, whereby the air is caused to enter the furnace and, without change of direction, to pass up through the fire.

2. The retort-shaped furnace, provided with openings for the entrance and discharge of the air, arranged in opposite ends or sides of the furnace in such relation to each other that the air will enter the furnace, pass up through the fire, and escape or pass out from the furnace without abrupt change of direction, as shown and described.

3. In a barrel-pitching apparatus, substantially as described, the formation of the upper part of the furnace with sides gradually inclined or drawn in toward the opening or conduit through which the heated air passes from the furnace to the barrel, to gradually condense and direct the blast, substantially as shown and set forth.

4. A barrel-pitching apparatus, in which an air-forcing apparatus, an air-heating furnace, and a frame or stand to support the latter above the ground are combined with suitable pipes, for operation substantially as herein shown and described.

5. The formation of the air-heating furnace in two sections, provided with openings for the entrance and discharge of the blast, as described, the upper section being removable from the lower, for the purposes set forth.

6. The combination of the upper and lower furnace-sections and the door formed in and making part of the upper section, substantially as and for the purposes set forth.

7. The formation in the upper section of the air-heating furnace of an opening, closed by isinglass or other transparent material, as and for the purposes described.

8. The employment, in connection with a barrel-pitching apparatus, organized and operating substantially as herein described, of a barrel-support or table, adjustable substantially in the manner set forth, so that the blast-pipe of the apparatus may be fitted to barrels of various sizes, as specified.

9. The combination, with the end of the blast-pipe within the barrel, of a revolving nozzle, substantially as shown and described, to direct the blast to any particular part of the barrel.

10. The formation, in the end or nozzle of the blast-pipe which is within the barrel, of slots, openings, or perforations, substantially as shown and described, for diffusing the blast through all parts of the barrel, as set forth.

11. The water-jacket or its equivalent, applied to the blast-pipe at the point where it passes through the barrel, substantially as and for the purposes described.

In testimony whereof I have hereunto set my hand in the presence of two subscribing witnesses.

LOUIS SCHULZE.

Witnesses:
M. BAILEY,
A. POLLOK.